May 6, 1958   N. AHLMANN   2,833,412
METHOD AND APPARATUS FOR SCREENING
Filed July 27, 1955

INVENTOR.
Nikolai Ahlmann, dec'd.
BY Klara Mathilde Ahlmann,
Legal Representative of
Nikolai Ahlmann
BY Pennie Edmonds Morton Barrows Taylor
Attorneys

United States Patent Office 2,833,412
Patented May 6, 1958

2,833,412

METHOD AND APPARATUS FOR SCREENING

Nikolai Ahlmann, deceased, late of Copenhagen, Denmark, by Klara Mathilde Ahlmann, legal representative, Copenhagen, Denmark, assignor to F. L. Smidth & Co., New York, N. Y., a corporation of New Jersey Application July 27, 1955, Serial No. 524,782

Claims priority, application Great Britain July 28, 1954

7 Claims. (Cl. 209—358)

This invention relates to the screening of pulverulent material on a horizontal screen and is concerned more particularly with a novel method by which such screening operations can be carried out more rapidly and effectively than heretofore and with a better separation of the fine and coarse fractions. The invention also includes an apparatus by which the method can be advantageously practiced.

In screening material on a horizontal screen, the usual procedure involves shaking or vibrating the screen to bring the fine particles in the material into contact with the screen, so that they will pass through the screen openings. As the screen is shaken or vibrated, the load of material on the screen moves relative to the screen somewhat as a single body and, as a result, a long time is required to bring all parts of the material into contact with the screen. Even when the screening operation is greatly prolonged, complete extraction of the fine fraction may not be produced, so that the results are inaccurate.

The present invention is directed to the provision of a method of screening on a horizontal screen, which overcomes the difficulties encountered in similar screening operations as now practiced and makes possible accurate screening in much less time than has heretofore been required. In carrying out the new method, the screen is not shaken or vibrated, but the layer of material on the screen is raised from the screen by the action of streams of fluid directed upon the screen from beneath. The screen and streams are given a relative movement, so that all parts of the layer are subjected repeatedly to the action of the streams, and the fluid, which has passed through the screen and layer, is confined and caused to return through the material and screen, so that the escaping fluid carries the fine particles with it through the screen.

In one form of the new apparatus for practicing the method, the screen is stationary and a member provided with orifices for escape of streams of fluid is mounted beneath the screen for rotation on an axis at right angles to the plane of the screen. Fluid under pressure is supplied to the member and it is caused to rotate, so that the streams of fluid issuing from the orifices pass upward through the screen and the layer of material thereon while describing circular paths relative to the stream. The fluid, which has passed through the screen, escapes by returning through those parts of the screen not being struck by the streams of fluid.

For a better understanding of the invention, reference may be made to the accompanying drawing, in which Fig. 1 is a diagrammatic cross-sectional view of one form of the new screening apparatus;

Figure 1:
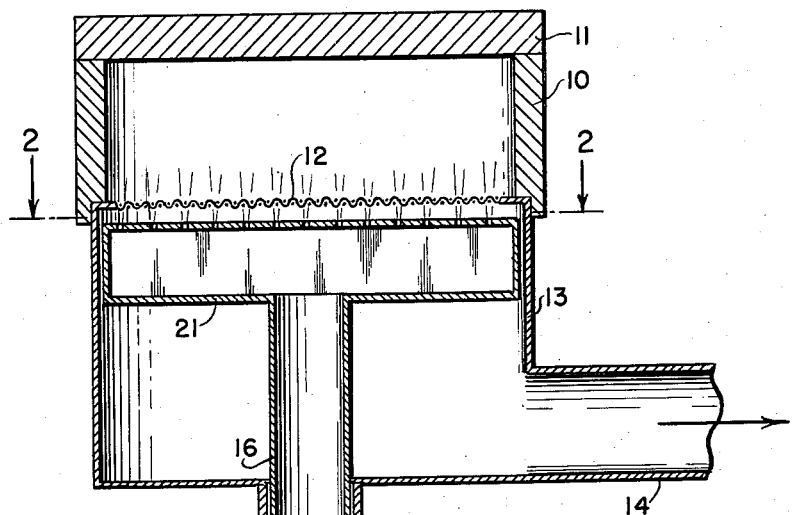

The new apparatus in the form shown in the drawing includes an enclosure 10, which is preferably of cylindrical form and has a top opening closed by a removable cover 11. A circular screen 12 of fine mesh is mounted to close the lower end of the enclosure and the enclosure is mounted on the upper end of a casing 13 having an exhaust duct 14 leading therefrom at the lower end.

The lower end of casing 13 is provided with a central opening surrounded by a bushing 15 serving as a bearing for a rotary pipe 16 provided at its lower end with a fixed sleeve 17 resting upon a fixed bearing 18. The pipe carries a pulley 19 by which it may be rotated by a motor or the like. A stationary supply pipe 20 has an upward section extending through bearing 18 and into sleeve 17, which acts as a gland.

An orifice member 21 is mounted at the upper end of pipe 16 within casing 13. The member extends across the pipe from substantially one side of the screen to the other and it is provided with a plurality of orifices 22 at its top surface. The orifices are asymmetrically arranged with relation to the axis of rotation of pipe 16, so that, as the pipe rotates, the orifices discharge streams defining separate circular paths on the screen.

Figure 3:
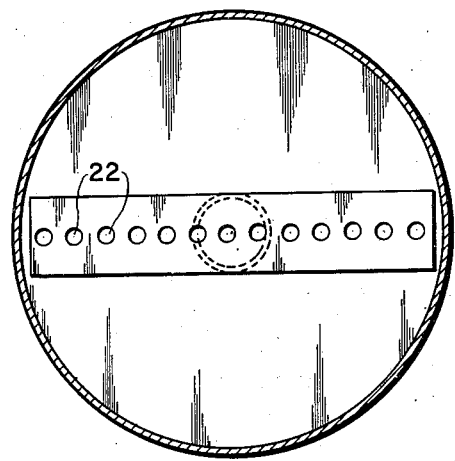
Fig. 3 is a vertical sectional view showing a modified form of one part of the apparatus.
Figure 2:
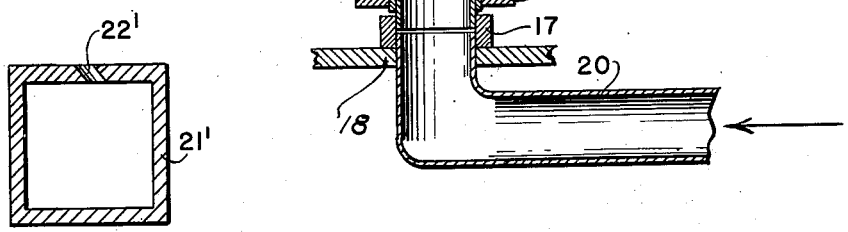
Fig. 2 is a sectional view on the line 2—2 of Fig. 1.

In the construction shown in Figs. 1 and 2, the orifices 22 direct the streams vertically against the under side of the screen and the rotation of pipe 16 and orifice member 21 is effected by a driven belt trained about pulley 19. In the modified construction shown in Fig. 3, the orifice member 21' is provided with orifices 22', which direct the streams of fluid against the screen obliquely and in such manner that the orifice member and its pipe are caused to rotate by the reaction of the streams leaving the orifices. With this arrangement, the pulley 19 and belt drive are unnecessary.

In the use of the apparatus described, the cover 11 is removed and the sample of material is deposited upon the screen and distributed thereover. A fluid, such as air under pressure, is then supplied through pipe 20 and pipe 16 with the orifice member fast thereon is caused to rotate. Streams of fluid escaping through the orifices 22 pass through the screen and raise the material therefrom. Since the casing 10 is closed, the fluid can escape only through the screen and, as the fluid passes down through the material and screen, it carries with it the fine particles of material. The operation is carried on until no more fines are carried off with the escaping fluid.

As an illustration of the efficiency of the screening operation carried on by the apparatus described, the following example may be given. A sample of Portland cement was screened in a shaking apparatus of the usual construction with a horizontal screen cloth having 4900 meshes to the square centimeter and, after 15 minutes of screening, the residue was about 15%. When this same sample was screened in the apparatus of the invention, the same residue was obtained in an operation taking 30 seconds. On prolonging the treatment in the new apparatus to 1.5 minutes, the residue was reduced to about 12%, which shows that the true particle size of the sample was not accurately determined in the screening operation with the prior apparatus.

In the apparatus described, the orifice member is rotated while the screen is maintained stationary. It will be apparent, however, that the reverse arrangement could be used with the screen rotated and the orifice member held stationary.

For most screening operations, the fluid employed is compressed air, but, if the material to be screened is adversely affected by air, the operation can be carried on by means of an inert gas. Also, when clay or hygroscopic materials, which cannot readily be screened in the dry state, are to be screened in accordance with the invention, the fluid employed may be a liquid, such as water, instead of a gas.

What is claimed is:

1. Apparatus for screening finely divided material, which comprises a substantially horizontal screen for supporting a layer of material, the screen having fine apertures, means for directing streams of fluid against the under surface only of the screen, the directing means including an orifice member beneath the screen and the fluid passing upwardly through the screen, means for causing relative movement of the member and screen to subject all parts of the screen to the action of the streams, an enclosure above the screen confining the fluid, which has passed upwardly through the screen, and causing it to return through the screen, a casing below the screen enclosing the orifice member, and an outlet duct for conducting from the casing the fluid, which has returned through the screen, and the fine fraction entrained in the fluid.

2. The apparatus of claim 1, in which the screen is stationary, the orifice member is mounted for rotation on an axis at right angles to the plane of the screen, and means are provided for rotating the member.

3. The apparatus of claim 1, in which the orifice member is mounted on a pipe supported for rotation in an opening through the bottom of the casing, and a stationary pipe supplies fluid to the movable pipe.

4. The apparatus of claim 1, in which the enclosure has a removable cover and is cylindrical in cross-section.

5. The apparatus of claim 1, in which the orifices are formed to direct the streams of fluid against the stream obliquely and in such manner that the orifice member is caused to rotate by the reaction of the streams.

6. A method of screening successive batches of material upon a substantially horizontal screen, which comprises depositing a layer of material upon the screen, enclosing a space containing the deposited material and defined at its bottom by the entire area of the screen, passing streams of a gas under pressure through the screen and the layer from beneath and into the enclosed space, the streams lifting from the screen the material lying in their paths and the continual introduction of gas through the screen into the space causing gas under pressure to collect in the space and to escape from the space through the area of the screen not struck by the streams, the escaping gas returning the lifted material to the screen and carrying fine material with it through the screen and away from the latter, and causing relative movement of the screen and streams to subject substantially all parts of the layer to the action of the streams.

7. The method of claim 6, in which the relative movement is rotational and the streams describe separate concentric paths on the screen.

References Cited in the file of this patent
UNITED STATES PATENTS

| | | |
|---|---|---|
| 1,103,167 | Wood | July 14, 1914 |
| 2,608,981 | Jackson | Sept. 2, 1952 |
| 2,732,068 | Howe | Jan. 24, 1956 |
| 2,751,079 | Ahlmann | June 19, 1956 |